United States Patent [19]
Carlyon, Jr.

[11] 3,841,023
[45] Oct. 15, 1974

[54] DISPLAY APPARATUS FOR POTTED PLANTS

[76] Inventor: Richard A. Carlyon, Jr., 751 No. Edmonds Dr., Carson City, Nev. 89701

[22] Filed: June 12, 1973

[21] Appl. No.: 369,301

Related U.S. Application Data

[63] Continuation-in-part of Ser. No. 253,397, May 15, 1972, abandoned, which is a continuation-in-part of Ser. No. 126,636, March 22, 1971, abandoned.

[52] U.S. Cl. .......................... 47/38, 239/20, 47/16, 47/34.12
[51] Int. Cl. .............................................. A01g 9/16
[58] Field of Search .......... 47/34.12, 38, 39, 14.16, 47/1.2; 239/17, 20

[56] References Cited
UNITED STATES PATENTS

| | | | |
|---|---|---|---|
| 1,322,803 | 11/1919 | MacFadden | 239/17 X |
| 2,121,461 | 6/1938 | Widmann | 47/1.2 |
| 2,940,218 | 6/1960 | Carter | 47/1.2 |
| 3,151,811 | 10/1964 | Hruby | 239/20 |
| 3,451,622 | 6/1969 | Forney | 239/20 |
| 3,452,475 | 7/1969 | Johnson | 47/38 |
| 3,529,379 | 9/1970 | Ware | 47/17 |
| 3,616,560 | 11/1971 | Mun | 47/1.2 |

*Primary Examiner*—Robert E. Bagwill
*Attorney, Agent, or Firm*—Jessup & Beecher

[57] ABSTRACT

A marketing apparatus is provided for displaying potted plants, and which is in the form of a tier of display dishes supported on a reservoir base, the display dishes being separated vertically from one another by interposed tubular spacers. The potted plants are supported and displayed around the periphery of each display dish. A reservoir is formed in the base, and a pump is provided for circulating the water from the reservoir to the top display dish to cause the water to flow down through the dishes in the tier so as to irrigate the potted plants supported by the dishes. Each dish fills from the bottom up to a particular depth before the water drains to the next lower dish, so that the plants in the individual pots are watered thoroughly and completely without problems of splashing dirt or wetting the foliage. A timer is provided to cause the pump to operate and initiate the irrigating process at particular times, for example, after store hours.

8 Claims, 4 Drawing Figures

PATENTED OCT 15 1974

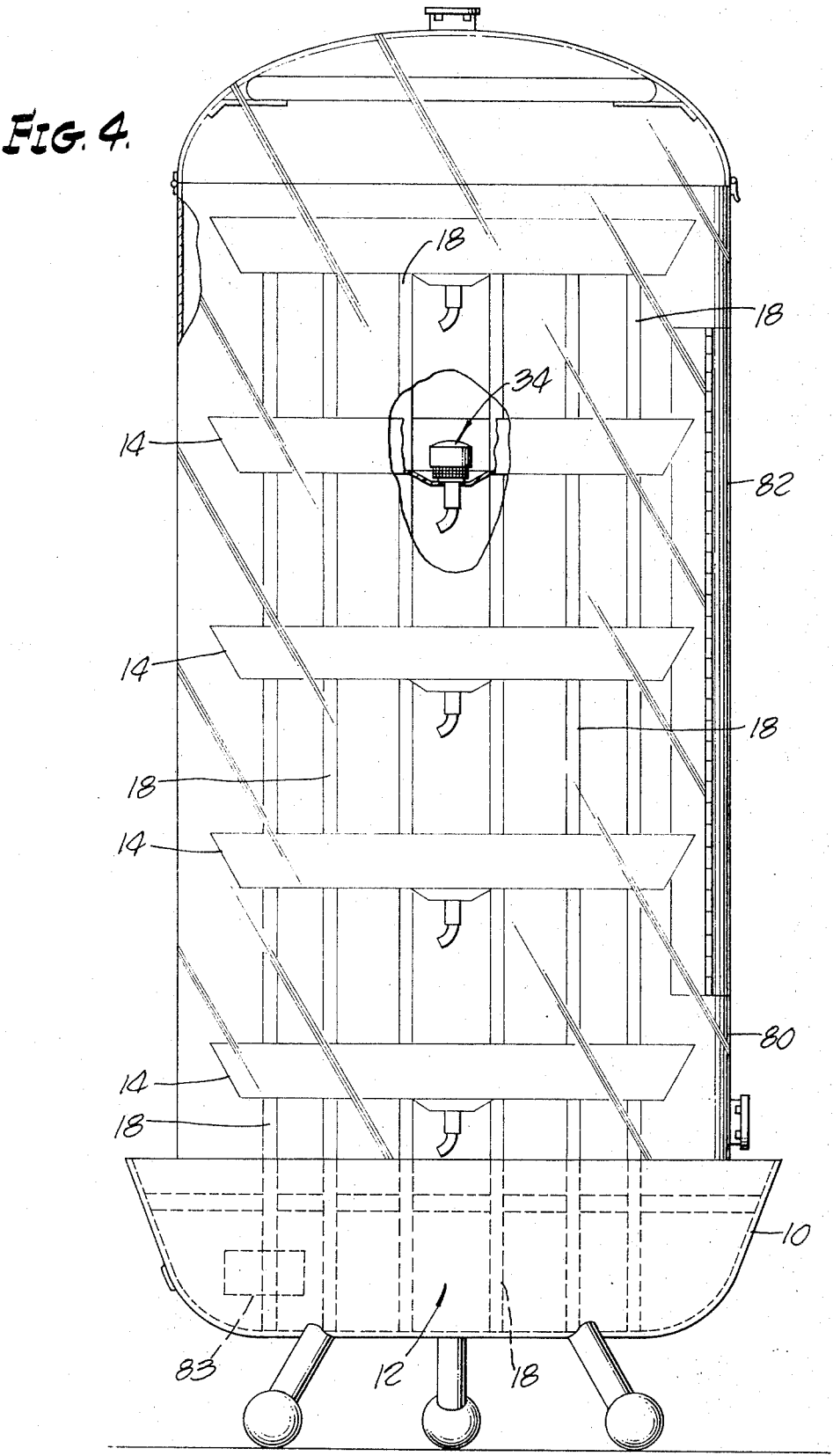

DISPLAY APPARATUS FOR POTTED PLANTS

This application is a continuation-in-part of copending application Ser. No. 253,397 filed May 15, 1972 which, in turn, is a continuation-in-part of application Ser. No. 126,636 filed Mar. 22, 1971, both of which have now been abandoned.

BACKGROUND OF THE INVENTION

The apparatus of the present invention provides an attractive marketing display for small potted plants. The display is intended to be used in supermarkets or other retail outlets. The display serves to overcome problems usually encountered in the marketing and sale of potted plants. For example, the display apparatus of the invention is controlled to water the plants from the bottom up at appropriate intervals, preferably after business hours, and without any splashing of mud out of the individual pots as would be the case with any top watering method. The timing is such that the plants are thoroughly watered, and also have sufficient time to drain, so that subsequent handling by the customers does not occur during or immediately after the watering process.

In brief, the display apparatus of the invention provides for the timed watering of the potted plants, preferably after business hours, and without any splashing. The apparatus also insures that the watering will be completed, and that the plants will be relatively dry and drip free before the pots are handles by the customers.

In a constructed embodiment of the invention, all the potted plants around the outside of each display dish are tilted outwardly for easy customer access, and for maximum visual display. Room is provided toward the center of each display dish to serve as a storage for additional plants. The latter plants may be moved to the outside display area of each display dish as the former plants are sold. All the potted plants in each display dish, both inside and outside, are watered automatically by the apparatus.

Watering is accomplished by a submersible pump located within the reservoir in the base of the apparatus, and which, when activated, pumps water from the reservoir to the top display dish to fill the top dish to a desired depth of, for example, approximately 1 inch. The water then drains through an appropriate standpipe drain unit in the top dish to the next lower display dish which then fills to a desired depth. The process is repeated until all the dishes are filled to the desired depth. The pump is the de-activated, and all the display dishes and pots drain for the balance of the night, for example, resulting in moist, yet drip-dry pots during store hours.

The embodiment to be described is constructed so that any one of the display dishes can be removed from the watering cycle is desired by simply removing the drain unit located within that dish. A wash-down hose unit is provided which permits the operator to use the irrigation pump to wash down and clean the display dishes. All dirt and debris washed from the display dishes are retained in a simple sock filter, as will be described. A fountain is provided in the reservoir in the embodiment to be described, which not only creates the sound of bubbling water at all times in the display, so as to give life to the display, but, which also serves to aerate the water in the reservoir.

In a second embodiment, the display apparatus of the invention is enclosed in a housing, such as a transparent plastic dome, and hot water is circulated through the apparatus to simulate hothouse conditions.

BRIEF DESCRIPTION OF THE DRAWINGS

FIG. 4 is a side elevation of the hothouse embodiment of the invention.

DETAILED DESCRIPTION OF THE ILLUSTRATED EMBODIMENTS

Figure 1:
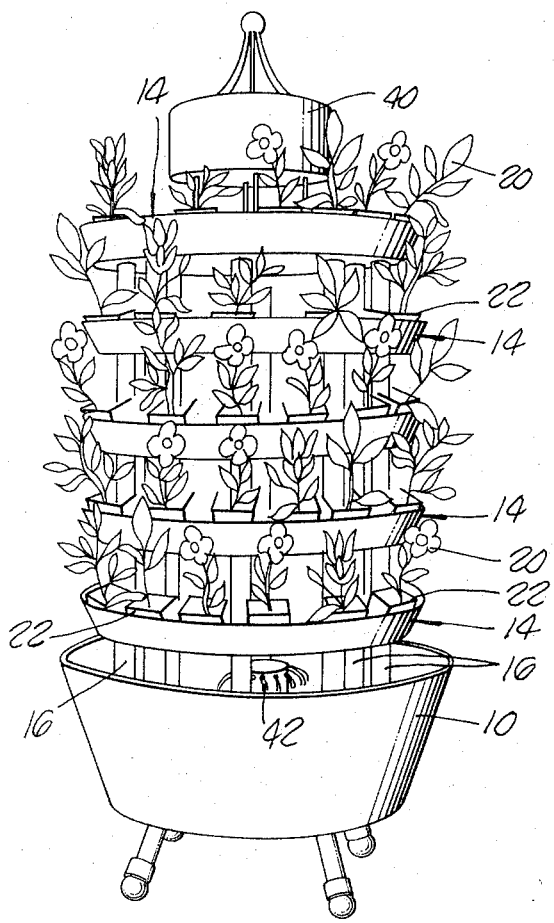
FIG. 1 is a side elevation of a display apparatus embodying the concepts of the invention.
Figure 2:
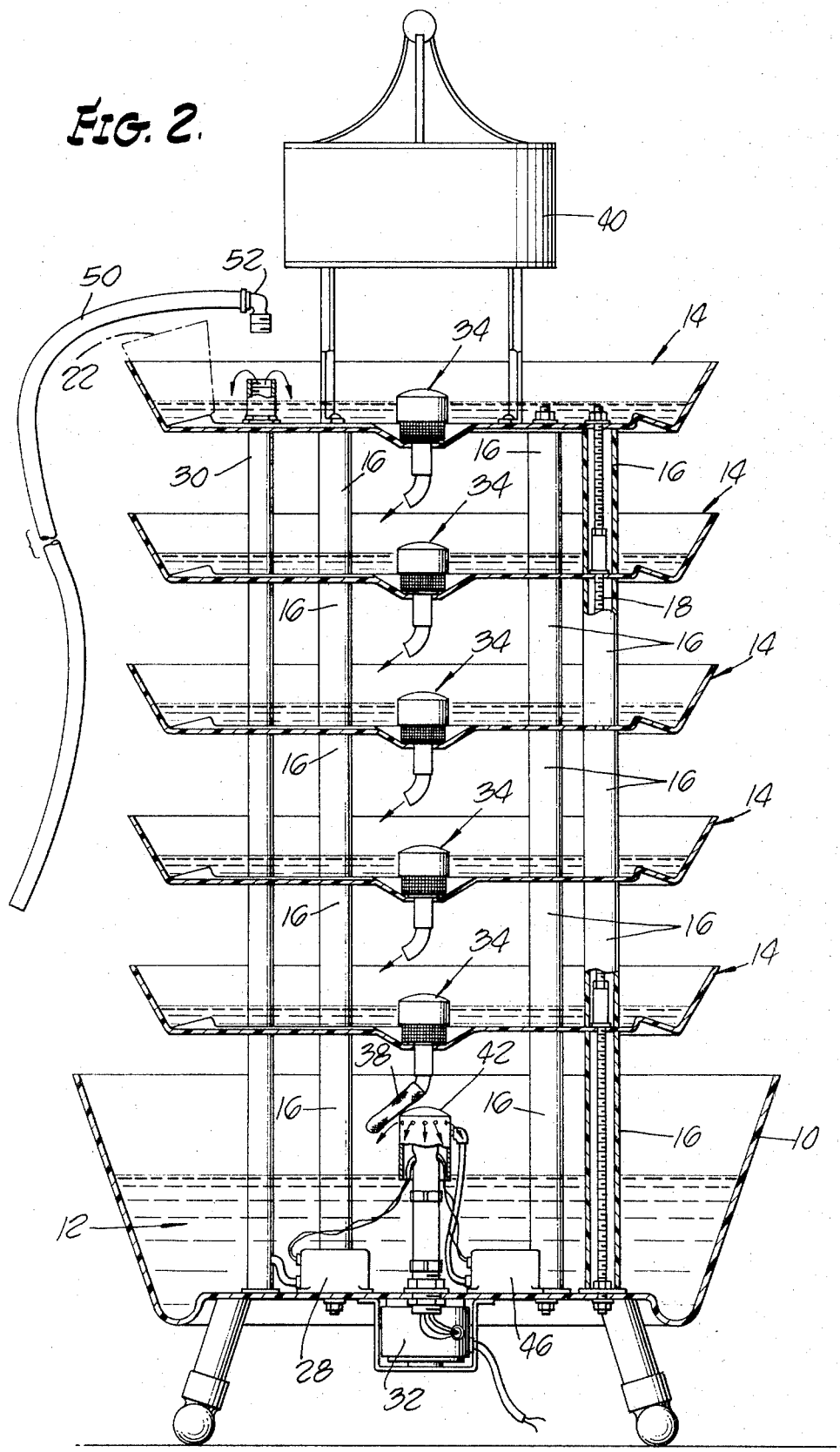
FIG. 2 is a vertical section of the display apparatus of FIG. 1.

The display apparatus shown in FIGS. 1 and 2 includes a base 10 which forms a reservoir 12. A plurality of circular display dishes 14 are supported in a stacked relationship on the base 10. The dishes 14 are supported by a plurality of tubular spacers 16 (FIG. 2) which, in turn, are supported on inner rods 18 extending upwardly from the base.

The display dishes 14 may be formed, for example, of high impact styrene plastic, and the spacers 16 may be formed of polyvinylchloride. The inner threaded tension rods 18 may be composed of steel or plastic and act as a means of securely locking the entire structure into a rigid unit. The spacers 16 are centered on the individual rods 18 by means of plastic plugs which serve to center the spacers on the respective rods. The base 10 may be formed, for example, of fiberglass, or appropriate plastic, or other materials. This method of construction allows the unit to be broken down for shipment and reassembled easily on the job.

As shown in FIG. 1, the plants 20 are supported in pots 22 around the peripheral edge of each of the display dishes 14. The display dishes are preferably shaped so that the pots are supported around their individual peripheries each in an inclined position for maximum display and ease of handling.

A first submersible pump 28 is mounted in the reservoir 12, and it serves to pump water through a vertical pipe 30, which is located within one vertical spacer 16 which contains no tension rod 18, to the top display dish 14 of the apparatus. The pump 28 is controlled by a clock 32 mounted on the bottom of the base 10, so that the pump 28 is activated only at certain preselected times, such as for predetermined time periods after business hours. The water pumped by the pump through the pipe 30 is caused to fill the uppermost display dish 14 to a predetermined depth, and when that depth is achieved, a drainage unit 34, to be described in more detail in conjunction with FIG. 3, causes the water to drain to the next lower dish 14, and the procedure is repeated from dish-to-dish until the water from the lower dish is drained through its drainage unit 34 back to the reservoir 12. The lowermost drainage unit 34 has its outlet covered by a silk sock filter 38, or the like, to assure that nor dirt or debris will be drained back to the reservoir.

Therefore, during the irrigation cycle, water to a predetermined depth is maintained in each of the display dishes 14, so that the pots supported in the individual dishes may be appropriately watered from the bottom, without splashing or wetting the foliage. At the end of the irrigation cycle, the pump 28 is turned off by the clock 32, and the water in each of the display dishes 14 slowly drains through the respective drainage unit 34 to the next lower dish, until all the water has been returned to the reservoir 12. Then a sufficient time interval is permitted to elapse before business hours, so that the plants in the individual pots will be completely drained before being handled by the customers.

A decorative turret 40 may be mounted on top of the display apparatus, and it can bear any desired advertising message. A fountain 42 is mounted in the reservoir 12, and the fountain is continuously activated by a submersible pump 46. The fountain 42 creates a bubbling noise within the display at all times to impart life to the display, and it also serves to aerate the water in the reservoir. A hose 50 may be provided which has a fitting 52 that may be clamped over the upper end of the pipe 30, so that the water pumped by the pump 28 may be used for cleaning out the dishes 14 during a cleaning operation.

Figure 3:
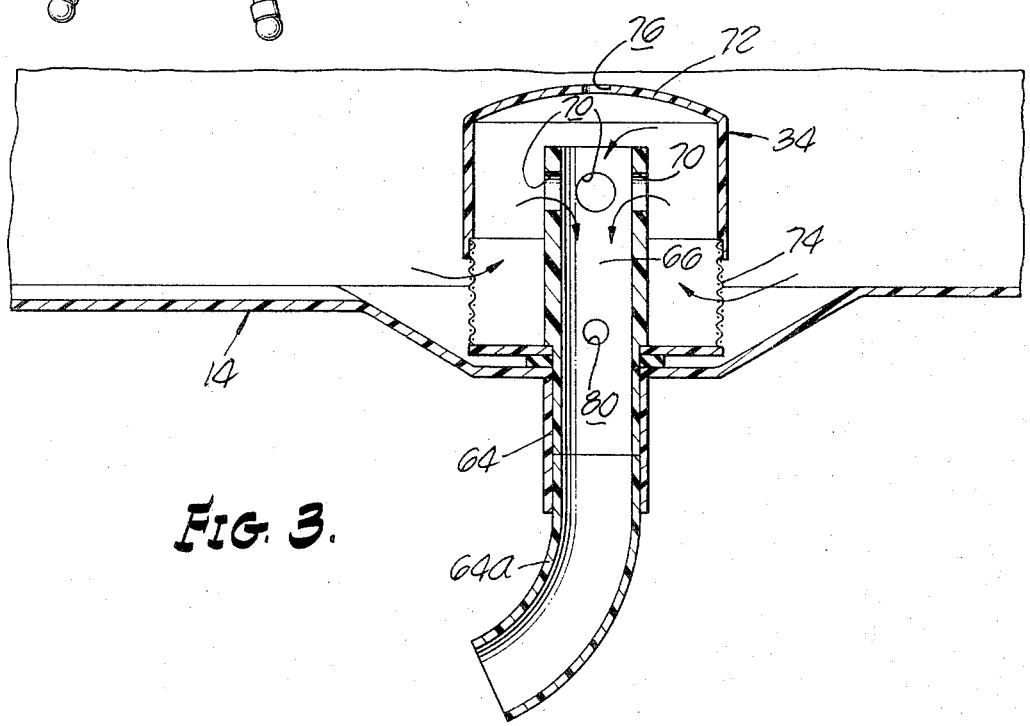
FIG. 3 is a detailed enlarged view of an improved irrigation and drainage unit which is incorporated in each display dish of the apparatus to be described.

The details of the drainage unit 34 are shown in the enlarged representation of FIG. 3. Each unit includes, for example, a ¾-inch polyvinylchloride plug bushing 64 which extends down through a hole in the bottom of the corresponding display dish 14, and is held in place by a PVC coupling 64. Overflow holes 70 are provided in the pipe 66 at the desired water level in the dish 14.

A tubular cap 72, which may also be composed of polyvinylchloride, is adhesively mounted over the top of the pipe 66. A mesh screen 74 extends from the cap 72 to the bottom of the dish 14. An emergency overflow hole 76 is provided in the top of the cap to provide drainage in the event the hole 70 plugs up. An elbow 64a is provided at the bottom of the pipe 64 to divert water flowing through the pipe away from the emergency overflow hole 76 in the next lower unit. A further drain hole 80 is provided to cause the dish 14 to be completely drained at the end of the irrigation cycle. This drain unit is easily removed for cleaning or elimination of watering cycle by simply sliding the unit up and out.

In the embodiment of FIG. 4, the dish-shaped members 14 are enclosed in a housing 80. The housing 80 may be composed of transparent material and may be constructed so as to be easily rotated to give access to all of the interior. An access door 82 may be provided in the housing 80. The housing extends as a dome over the dish-shaped members to enclose the plants held in the display dishes 14 in a hothouse environment.

The water in the reservoir 12 is heated to a temperature, for example, of the order of 75° Fahrenheit. This heating may be achieved by means of an immersion heater 83 in the reservoir 12 in conjunction with a thermostat, or other suitable water heating and temperature control means may be used. As before, the water from the reservoir is circulated to the top of the apparatus during the irrigation cycle, and in the latter embodiment, the heated water passes from one display dish to the next watering the plants contained therein from the bottom up with heated water.

Between the warm moist air rising within the housing 80 from the water in the reservoir 12 at the bottom of the apparatus, and the moist even heat supplied by the heated water as it passes down through the display dishes during the irrigation cycle, a uniform and consistent heating of the entire interior of the unit is accomplished.

While particular embodiments of the invention have been shown and described, modifications may be made. It is intended in the claims to cover all modifications which fall within the spirit and scope of the invention.

What is claimed:

1. Display apparatus for potted plants and the like, comprising: a base forming a reservoir for irrigating water; a plurality of display dishes for supporting and displaying potted plants; means for supporting said dishes in spaced coaxial relationship as a tier on said base and over said reservoir; a pipeline extending upwardly from the reservoir to the top of the tier; a pump mounted in said reservoir and coupled to said pipeline for pumping irrigating water from the reservoir up through the pipeline to the uppermost dish of the tier to permit water from the reservoir to fill the uppermost dish to a predetermined depth; and drainage means including a plurality of stand-pipe drain members mounted in respective ones of said display dishes for causing the irrigating water to pass down from each display dish to the next lower display dish at a relatively high rate after a particular depth of the irrigating water in each display dish has been achieved, and including further means for completely draining the irrigating water from each display dish at a relatively low rate, ultimately to cause the irrigating water to be returned to the reservoir.

2. The display apparatus defined in claim 1, and which includes a clock unit connected to said pump for controlling the times at which said pump is activated.

3. The display apparatus defined in claim 1, and which includes a sock filter member mounted on the outlet of the drain member in the lowermost display dish.

4. The display apparatus defined in claim 1, in which each of said stand-pipe drain members is removably mounted in a hole in the bottom of a corresponding display dish, and each includes a first drainage hole for draining the irrigating water from the corresponding display dish at the relatively high rate after the irrigating water has achieved said predetermined depth, and a second drainage hole for completely draining the irrigating water from the corresponding display dish at the relatively low rate at the termination of an irrigation cycle.

5. The display apparatus defined in claim 1, and which includes a fountain mounted in said reservoir, and a separate pump for circulating water from the reservoir through said fountain to aerate the water.

6. The display apparatus defined in claim 1, and which includes an enclosing housing for the display and potted plants therein.

7. The display apparatus defined in claim 6, and which includes heating means for heating the irrigating water in the reservoir so as to create hothouse conditions within the housing.

8. The display apparatus defined in claim 4, in which each of said stand-pipe drainage members has a tubular configuration and includes a cup-shaped cap and a tubular mesh screen extending from the bottom of the cap to filter the irrigating water entering the drainage holes in the drain member.

* * * * *